(12) United States Patent
Dragic

(10) Patent No.: US 7,505,667 B2
(45) Date of Patent: Mar. 17, 2009

(54) WAVEGUIDE CONFIGURATION

(76) Inventor: Peter Dragic, 4631 N. Malden, #2N, Chicago, IL (US) 60640

( * ) Notice: Subject to any disclaimer, the term of this patent is extended or adjusted under 35 U.S.C. 154(b) by 0 days.

(21) Appl. No.: 12/218,553

(22) Filed: Jul. 16, 2008

(65) Prior Publication Data

US 2008/0273851 A1 Nov. 6, 2008

Related U.S. Application Data

(63) Continuation of application No. 11/052,464, filed on Feb. 7, 2005, now Pat. No. 7,209,626, which is a continuation-in-part of application No. 10/766,289, filed on Jan. 27, 2004, now Pat. No. 7,079,749.

(60) Provisional application No. 60/442,843, filed on Jan. 27, 2003.

(51) Int. Cl.
*G02B 6/00* (2006.01)

(52) U.S. Cl. .................. 385/142; 385/126; 385/141; 385/144

(58) Field of Classification Search ................. 385/126, 385/141, 142, 144
See application file for complete search history.

(56) References Cited

U.S. PATENT DOCUMENTS

| | | | | |
|---|---|---|---|---|
| 7,006,752 | B2 * | 2/2006 | Dragic | 385/142 |
| 7,079,749 | B2 * | 7/2006 | Dragic | 385/142 |
| 7,209,626 | B2 * | 4/2007 | Dragic | 385/142 |
| 7,418,187 | B2 * | 8/2008 | Dragic | 385/142 |

* cited by examiner

*Primary Examiner*—Charlie Peng
(74) *Attorney, Agent, or Firm*—Patti, Hewitt & Arezina LLC

(57) ABSTRACT

A waveguide configuration comprising a core, a first cladding, a second cladding, and a buffer. The core includes an index of refraction and an acoustic shear velocity. The first cladding extends about the core and has an acoustic shear velocity which is less than that of the core and an index of refraction which is less than the core. The second cladding extends about the first cladding. The second cladding has an acoustic shear velocity which is greater than that of the first cladding and less than the acoustic shear velocity of the core. The second cladding has an index of refraction which is less than that of an optical mode. The buffer extends about the second cladding.

6 Claims, 3 Drawing Sheets

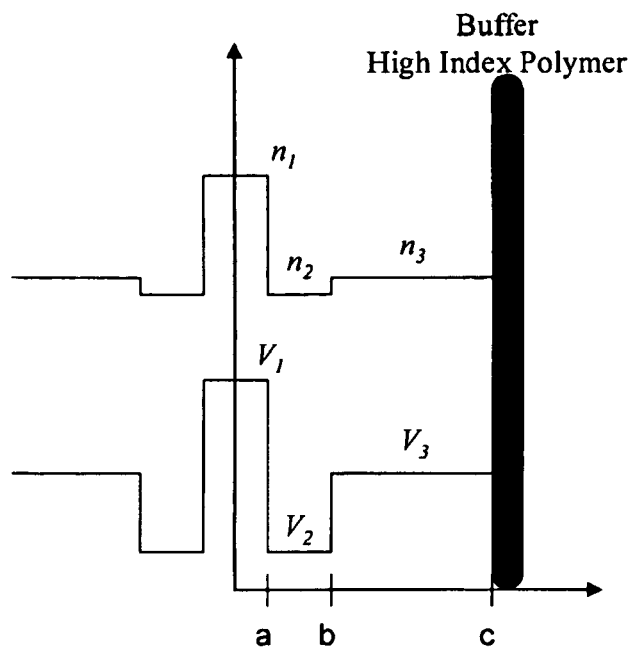
Figure 3
Figure 4
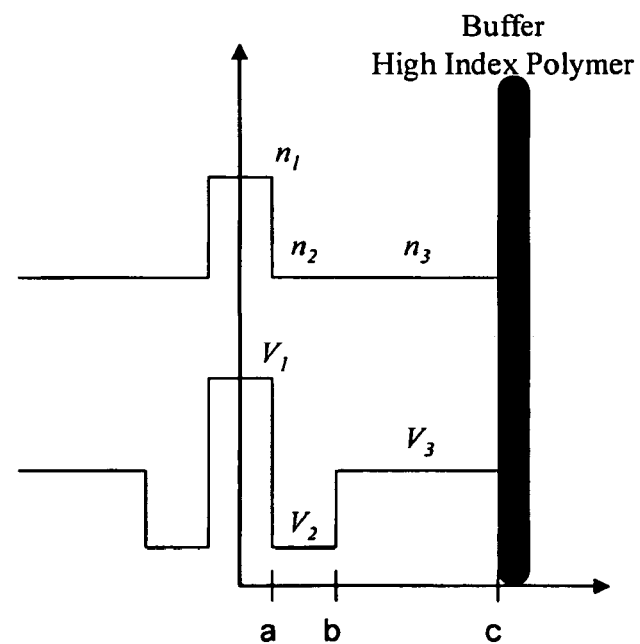

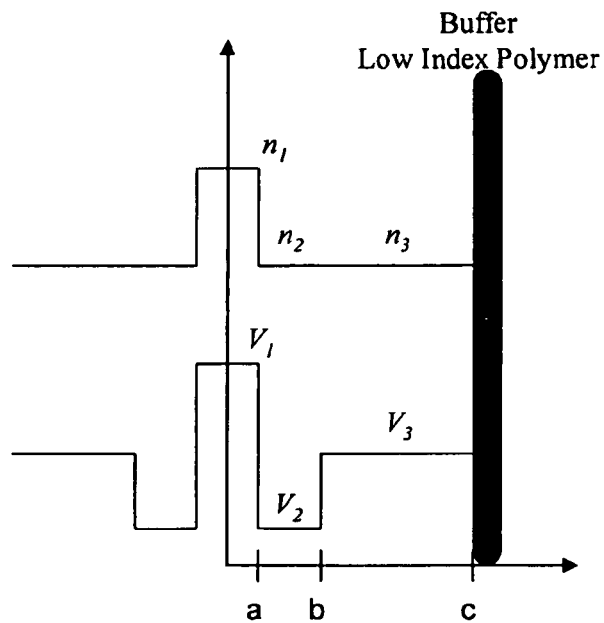
Figure 5
Figure 6
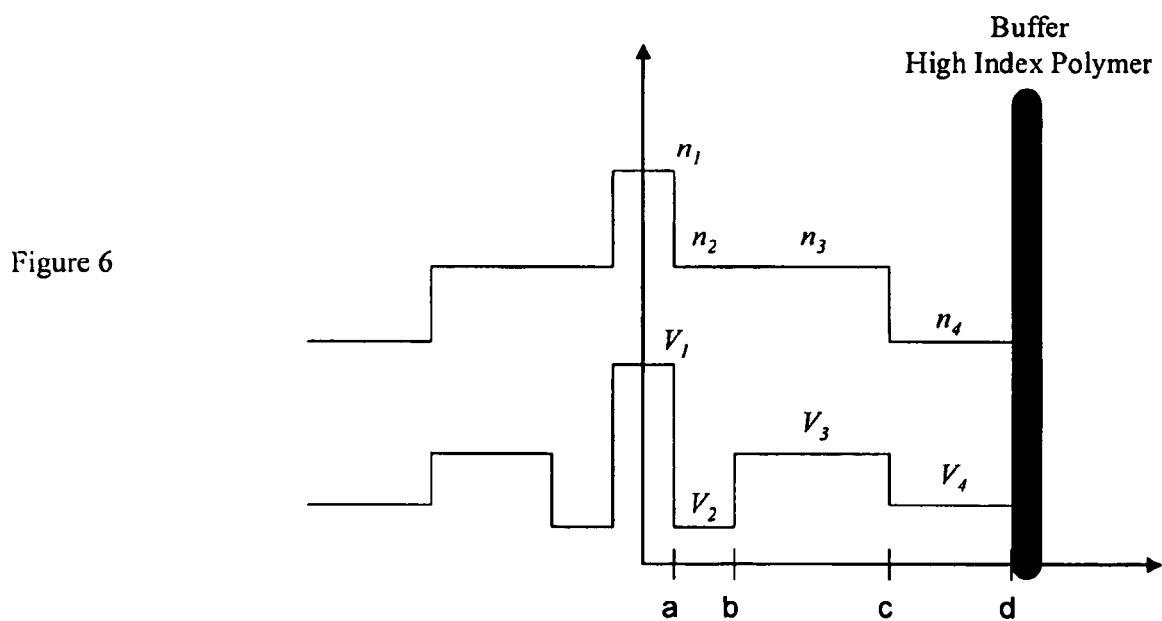

WAVEGUIDE CONFIGURATION

CROSS-REFERENCE TO RELATED APPLICATION

This application is a continuation of U.S. patent application Ser. No. 11/052,464 filed Feb. 7, 2005, now U.S. Pat. No. 7,209,626 which is a continuation-in-part of U.S. patent application Ser. No. 10/766,289 filed Jan. 27, 2004, now U.S. Pat. No. 7,079,749 which claims priority from U.S. Provisional Patent Application Ser. No. 60/442,843 filed Jan. 27, 2003, the disclosure of both of which are incorporated by reference in their entirety.

BACKGROUND OF THE INVENTION

1. Field of the Invention

The present invention relates in general to waveguides, and more particularly, to a waveguide comprising a particular construction so as to suppress the SBS effect. It will be understood that a waveguide is likewise commonly referred to as fiber optic cable, or fibers.

2. Background Art

The use of waveguides in various industries such as telecommunications and lasers, among others, has been steadily increasing. While the ability to send optical signals through waveguides is well known in the art, certain phenomena have been observed. In particular, one effect that has been observed is the Stimulated Brillouin Scattering (SBS) effect. SBS is an important example of a stimulated scattering process; light scattering which occurs when the intensity of the light field itself affects the propagating medium. This phenomenon has become relevant in the optical fiber industry, due to the increasing intensity required in optical fiber cores and the relatively long interaction lengths. SBS is one of the major limiting factors on the amount of power that can be transmitted via an optical fiber.

Certain prior art references have attempted to suppress the SBS effect through the use of waveguides which have particular constructions. While some of the solutions have suppressed the SBS effect to some extent, many of these waveguides have constructions which are difficult to manufacture on a large scale, or which are economically not feasible.

Accordingly, it is an object of the invention to overcome the deficiencies in the prior art. For example, it is an object of the present invention to provide a waveguide construction which is both economical to manufacture and feasible to manufacture which suppresses the SBS effect.

It is likewise an object of the invention to provide enhanced suppression of SBS through further development and improvement of the fiber disclosed in U.S. Pat. No. 6,587,623. The entire disclosure of U.S. Pat. No. 6,587,623 is incorporated herein by reference.

These objects as well as other objects of the present invention will become apparent in light of the present specification, claims, and drawings.

SUMMARY OF THE INVENTION

The invention comprises a waveguide configuration with engineered optical and acoustic properties. The waveguide configuration comprises, a core, a first cladding, a second cladding, and a buffer. The core includes an index of refraction and an acoustic shear velocity. The first cladding extends about the core and has an acoustic shear velocity which is less than that of the core and an index of refraction which is less than the core. The second cladding extends about the first cladding. The second cladding has an acoustic shear velocity which is greater than that of the first cladding and less than the acoustic shear velocity of the core. The second cladding has an index of refraction which is less than that of an optical mode. The buffer extends about the second cladding.

In a preferred embodiment, a cross-sectional configuration of each of the core, the first cladding and the second cladding are substantially uniform along a length thereof.

In another preferred embodiment, the waveguide configuration further comprises a third cladding positioned between the second cladding and the buffer. The third cladding has an index of refraction less than that of each of the core, first cladding and second cladding.

In another preferred embodiment, the second cladding has an acoustic shear velocity that is less than that of the core and an index of refraction that is less than that of the core.

In another preferred embodiment, the core comprises substantially undoped $SiO_2$, the first cladding comprises $SiO_2$ doped with F, $P_2O_5$, and $GeO_2$, the second cladding comprises $SiO_2$ doped with F.

In yet another preferred embodiment, the core comprises $SiO_2$ doped with $Al_2O_3$, $P_2O_5$, F, $GeO_2$ and Er, a first cladding comprises $SiO_2$ doped with F and $GeO_2$, and a second cladding comprises substantially undoped $SiO_2$.

In another embodiment, the core comprises $SiO_2$ doped with $Al_2O_3$, $P_2O_5$ and Yb, a first cladding comprises $SiO_2$ doped with F, $GeO_2$, $P_2O_5$, and a second cladding comprises $SiO_2$ doped with F and $P_2O_5$.

Preferably, wherein the waveguide comprises a third cladding extending about the second cladding, the core comprises $SiO_2$ doped with $Al_2O_3$, $P_2O_5$ and Yb, the first cladding comprises $SiO_2$ doped with F, $GeO_2$ and $P_2O_5$, the second cladding comprises $SiO_2$ doped with F and $P_2O_5$, and the third cladding comprises $SiO_2$ doped with F.

In one embodiment, each of the core, the first cladding and the second cladding include a radial thickness. The radial thickness of the second cladding is greater than that of the first cladding. In one such preferred embodiment, the radial thickness of the second cladding is greater than the combined radial thickness of the core.

In another embodiment, the radial thickness of the second cladding is greater than that of the core.

In yet another embodiment, each of the core, the first cladding and the second cladding include a radial thickness, the radial thickness of the first cladding being greater than that of the core.

BRIEF DESCRIPTION OF THE DRAWINGS

The invention will now be described with reference to the drawings wherein:

FIG. 3 of the drawings is a cross-sectional representation of the index of refraction and the acoustic shear velocity of an exemplary fiber of the present invention;

FIG. 4 of the drawings is a cross-sectional representation of the index of refraction and the acoustic shear velocity of an exemplary fiber of the present invention;

FIG. 5 of the drawings is a cross-sectional representation of the index of refraction and the acoustic shear velocity of an exemplary fiber of the present invention; and FIG. 6 of the drawings is a cross-sectional representation of the index of refraction and the acoustic shear velocity of an exemplary fiber of the present invention.

DETAILED DESCRIPTION OF THE INVENTION

Figure 1:
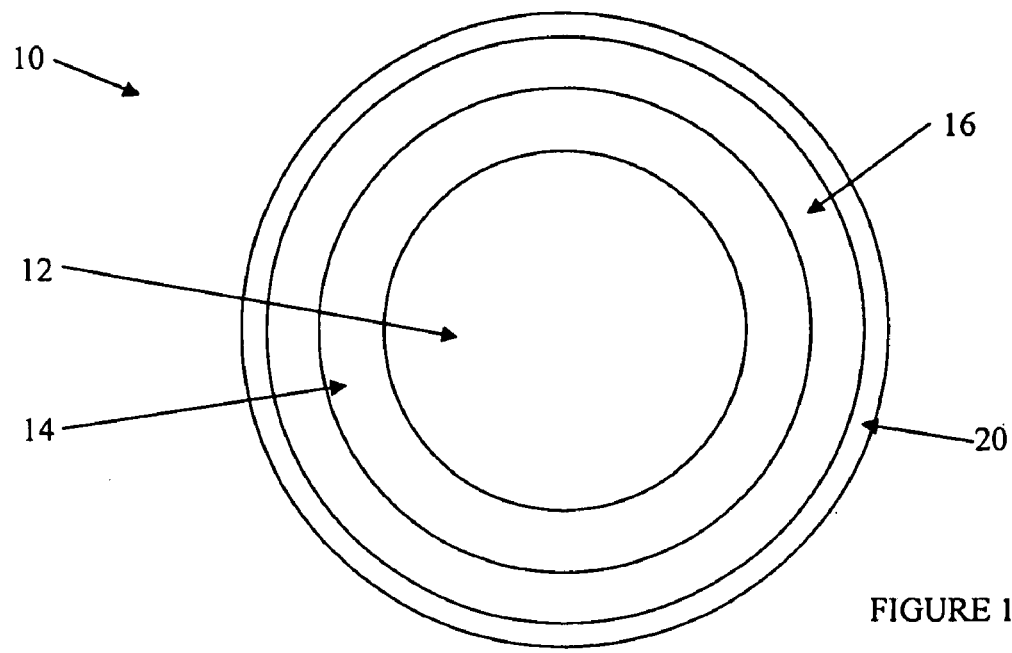
FIG. 1 of the drawings is a cross-sectional representation of a first waveguide configuration of the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
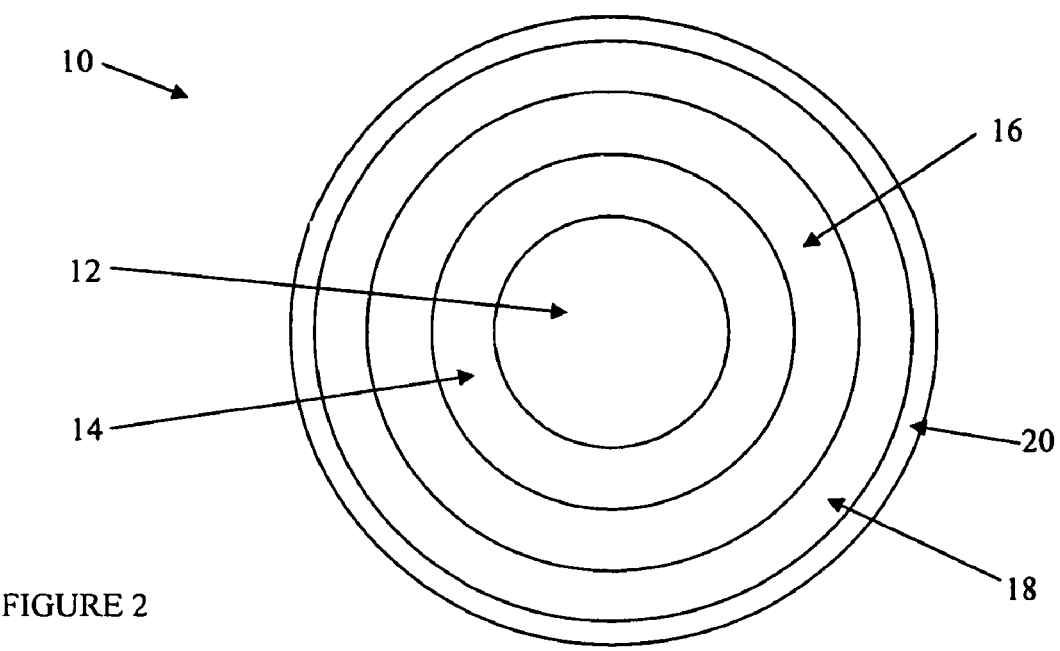
FIG. 2 of the drawings is a cross-sectional representation of a second waveguide configuration of the present invention.

Referring now to the drawings and in particular to FIG. 1, a waveguide configuration made in accordance with the present invention is shown generally as 10. Waveguide 10 includes core 12, a first cladding 14, a second cladding 16 and a buffer 20. In some applications, there may be a third cladding 18 as illustrated in FIG. 2. While the various layers are shown to have substantially uniform thicknesses, it will be understood that the particular thickness of any layer can be varied within the scope of the present invention. In addition, it is contemplated that the waveguide may comprise a substantially uniform cross-section along the length thereof. Among other cross-sectional configurations, circular cross-sectional configurations, are contemplated, as are oval shaped cores or cladding (i.e., for use with optical fibers that preserve polarization).

Core 12 is shown in FIG. 1 as comprising a first material having an index of refraction $n_{core}$ and a certain acoustic shear velocity $v_{core}$.

First cladding 14 extends around the core and is defined by an index of refraction $n_{clad1}$ and a certain acoustic shear velocity $v_{clad1}$. The acoustic shear velocity of the first cladding is less than that of the core (i.e., $v_{clad1} < v_{core}$). Similarly, the index of refraction of the first cladding is less than that of the core (i.e., $n_{core} > n_{clad1}$).

Second cladding 16 extends around the first cladding and is defined by an index of refraction $n_{clad2}$ and an acoustic shear velocity $v_{clad2}$. The acoustic shear velocity of the second cladding is greater than the acoustic shear velocity of the first cladding (i.e., $v_{clad2} > v_{clad1}$). Significantly, the acoustic shear velocity of the second cladding is less than the acoustic shear velocity of the core (i.e., $v_{core} > v_{clad2}$). In turn, the acoustic shear velocity of the second cladding is between that of the core and the first cladding. (i.e., $v_{core} > v_{clad2} > v_{clad1}$).

The overall optical mode has an index of refraction greater than that that of the second cladding (i.e., $n_{opticalmode} > n_{clad2}$). It will be understood that the optical mode is generally confined to the portion of the waveguide that carries the vast majority of the light propagating therethrough. In certain embodiments, the index of refraction of the second cladding will be lower than that of the first cladding (i.e., $n_{clad1} > n_{clad2}$). In other embodiments, the first and second cladding may have a similar, or identical, index of refraction.

In many embodiments, the second cladding will have a radial thickness that is greater than that of the first cladding, and in certain embodiments, greater than both the first cladding and the second cladding. Additionally, the first cladding in many contemplated embodiments will have a radial thickness that is greater than that of the core.

Buffer 20 extends around the second cladding and, as will be understood by those of skill in the art, imparts tensile strength and a certain flexibility to the fiber. Typical buffers of the type commonly used in connection with waveguides are contemplated for use, such as a natural or synthetic polymer. In certain instances, the buffer may comprise a relatively high index polymer. In other applications, the buffer may comprise a relatively low index polymer.

In certain applications, such as telecommunications, the above-described fiber is suitable for use. However, and as is shown in the embodiment of FIG. 2, in association with lasers, an additional, third cladding 18 is positioned between second cladding 16 and buffer 20. Third cladding 18 includes an index of refraction $n_{clad3}$ which is less than the index of refraction of first cladding 14, second cladding 16 and core 12. In some cases, the buffer and third-cladding layer may be replaced by a low-index polymer material.

A number of exemplary fibers of the present invention have been formulated pursuant to the present invention. Table I below identifies the effect of various dopants on $SiO_2$ which forms the basis of the following examples. It will be understood that the actual values identified in the chart tend to vary slightly from manufacturer to manufacturer due to variations in purification and manufacturing processes.

TABLE I

| Dopant | Index (% change/mol %) | Longitudinal Acoustic Velocity (m/s/mol %) | Sheer Acoustic Velocity (m/s/mol %) |
|---|---|---|---|
| $GeO_2$ | +0.062 | −45 to −65 | −45 to −55 |
| $P_2O_5$ | +0.020 | −84 | −111 |
| F | −0.091 | −185 | −159 |
| $Al_2O_3$ | +0.055 | +32 | +9.4 |

The following examples describe the various exemplary fibers. Of course, the invention is not limited to the below described fibers, and these fibers shall be deemed only as exemplary embodiments.

EXAMPLE 1

An exemplary transmission fiber has been determined based upon the above-identified criteria. The contemplated fiber includes a core comprising pure $SiO_2$ having a radius of 4.5 micrometers. The first cladding comprises 4.1 mol % F, 1.4 mol % $P_2O_5$ and 1.0 mol % $GeO_2$ doped $SiO_2$ having a radial thickness of 12.5 micrometers. The second cladding comprises 3.1 mol % F doped $SiO_2$ having a radial thickness of 62.5 micrometers. The buffer comprises a high index polymer.

As is shown in FIG. 3, in such an embodiment, the index of refraction of the core is greater than the index of refraction of the first cladding. The index of refraction of the second cladding is greater than the index of refraction of the first cladding. In other words, $n_{core} > n_{clad2} > n_{clad1}$. With respect to the acoustic shear velocity, the acoustic shear velocity of the core is greater than the acoustic shear velocity of the first cladding. The acoustic shear velocity of the second cladding is greater than the acoustic shear velocity of the first cladding. In other words, $v_{core} > v_{clad2} > v_{clad1}$.

EXAMPLE 2

An exemplary single clad Er doped fiber has been determined based upon the above-identified criteria. The contemplated fiber includes a core comprising 6.0 mol % $Al_2O_3$ and 0.1 mol % $P_2O_5$ and 0.2 mol % F and 0.1 mol % $GeO_2$ and 1000 ppm/wt. Er doped $SiO_2$ having a radius of 2.2 micrometers. The first cladding comprises 1.9 mol % F and 4.0 mol % $GeO_2$ doped $SiO_2$ having a radial thickness of 6 micrometers. The second cladding comprises pure $SiO_2$ having a radial thickness of 62.5 micrometers. A high index polymer buffer surrounds the second cladding.

In such an embodiment, as shown in FIG. 4, the index of refraction of the core is greater than the index of refraction of the first cladding. The index of refraction of the first cladding and the second cladding is substantially the same. In other words, $n_{core} > n_{clad1} = n_{clad2}$. The acoustic shear velocity of the core is greater than the acoustic shear velocity of the first cladding. The acoustic shear velocity of the second cladding is greater than the acoustic shear velocity of the first cladding. In other words, $v_{core} > v_{clad2} > v_{clad1}$.

EXAMPLE 3

An exemplary dual clad Yb doped fiber was determined based upon the above-identified criteria. The exemplary fiber includes a core comprising 1.4 mol % $Al_2O_3$ and 0.2 mol % $P_2O_5$ and 20,000 ppm/wt. Yb doped $SiO_2$ having a radius of 10 micrometers. The first cladding comprises 2.5 mol % F and 0.7 mol % $GeO_2$ and 9.1 mol % $P_2O_5$ doped $SiO_2$ having a radial thickness of 15 micrometers. The second cladding comprises 2.0 mol % F and 9.1 mol % $P_2O_5$ doped $SiO_2$ having a radial thickness of 150 micrometers. A low index polymer buffer surrounds the second cladding.

In such an embodiment, as shown in FIG. 5, the index of refraction of the core is greater than the index of refraction of the first cladding. The index of refraction of the first cladding and the second cladding is substantially the same. In other words, $n_{core} > n_{clad1} = n_{clad2}$. The acoustic shear velocity of the core is greater than the acoustic shear velocity of the first cladding. The acoustic shear velocity of the second cladding is greater than the acoustic shear velocity of the first cladding. In other words, $v_{core} > v_{clad2} > v_{clad1}$.

EXAMPLE 4

An exemplary dual clad Yb doped fiber with glass third cladding was determined based upon the above-identified criteria. The exemplary fiber includes a core comprising 1.4 mol % $Al_2O_3$ and 0.2 mol % $P_2O_5$ and 20,000 ppm/wt. Yb doped $SiO_2$ having a radius of 10 micrometers. The first cladding comprises 0.7 mol % F and 0.7 mol % $GeO_2$ and 9.1 mol % $P_2O_5$ doped $SiO_2$ having a radial thickness of 15 micrometers. The second cladding comprises 2.0 mol % F and 9.1 mol % $P_2O_5$ doped $SiO_2$ having a radial thickness of 150 micrometers. The third cladding comprises 4.0 mol % F doped $SiO_2$ having a radial thickness of 200 micrometers. A high index polymer buffer surrounds the third cladding.

In such an embodiment, as is shown in FIG. 6, the index of refraction of the core is greater than the index of refraction of the first cladding. The index of refraction of the first cladding and the second cladding is substantially the same. The index of refraction of the third cladding is less than that of the second cladding. In other words, $n_{core} > n_{clad1} = n_{clad2} > n_{clad3}$. The acoustic shear velocity of the core is greater than the acoustic shear velocity of the first cladding. The acoustic shear velocity of the second cladding is greater than the acoustic shear velocity of the first cladding. The acoustic shear velocity of the third cladding is less than the acoustic shear velocity of the third cladding but greater than the acoustic shear velocity of the second cladding. In other words, $v_{core} > v_{clad2} > v_{clad3} > v_{clad1}$.

In operation, acoustic waves are constantly radiating from the core, whether the core is acoustically guiding or not. This is the fundamental difference between the optical and acoustic modes and is a result of the fact that the glass behaves as a compressible fluid. The boundary between the first and second cladding results in a phenomenon substantially analogous to the total internal reflection of optical waves in the core. Thus, the first cladding substantially captures these waves, resulting in acoustic guidance. These waves are then re-transmitted into the core, interfering with the acoustic waves involved in the SBS process. This may also result in increased acoustic mode coupling into the first cladding layer. These processes then give rise to a degraded overlap between the optical and acoustic fields, leading to an increase in the threshold intensity for the onset of SBS.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A waveguide configuration comprising:
   a core having an index of refraction and an acoustic shear velocity;
   a first cladding extending about the core having an acoustic velocity which is less than that of the core and an index of refraction which is less than the core;
   a second cladding extending about the first cladding, the second cladding having an acoustic velocity which is less than that of the first cladding and less than the acoustic velocity of the core, the second cladding having an index of refraction which is less than the effective index of an optical mode.

2. The waveguide configuration of claim 1 further comprising a third cladding positioned between the second cladding and a buffer, the third cladding having an index of refraction less than that of each of the core, first cladding and second cladding.

3. The waveguide configuration of claim 1 wherein the core comprises $SiO_2$ doped with Al, at least one rare earth element, and at least on of Ge, P, F, and B.

4. The waveguide configuration of claim 1 wherein the core comprises $SiO_2$ doped with P, at least one rare earth element, and at least one of Ge, Al, F, and B.

5. The waveguide configuration of claim 1 further comprising a third cladding extending about the second cladding, the third cladding comprising $SiO_2$ doped with at least one of B or F.

6. The waveguide configuration of claim 1 wherein the second cladding comprises $SiO_2$ doped with at least one of P and Ge.

* * * * *